(12) United States Patent
Ehler

(10) Patent No.: US 7,533,894 B2
(45) Date of Patent: May 19, 2009

(54) CYCLE DIRECTION CONTROL SYSTEM

(75) Inventor: Bradley Dean Ehler, 6608 Pilot Peak Rd., Laramie, WY (US) 82070

(73) Assignee: Bradley Dean Ehler, Laramie, WY (US)

( * ) Notice: Subject to any disclaimer, the term of this patent is extended or adjusted under 35 U.S.C. 154(b) by 206 days.

(21) Appl. No.: 11/317,102

(22) Filed: Dec. 23, 2005

(65) Prior Publication Data

US 2007/0164533 A1   Jul. 19, 2007

(51) Int. Cl.
*B62K 19/00* (2006.01)
*B62K 21/00* (2006.01)

(52) U.S. Cl. ................... 280/270; 280/279; 280/282

(58) Field of Classification Search ............ 280/270, 280/279, 282, 283
See application file for complete search history.

(56) References Cited

U.S. PATENT DOCUMENTS

| | | | | |
|---|---|---|---|---|
| 4,480,847 A | * | 11/1984 | Oyama | .......... 280/270 |
| 5,542,689 A | * | 8/1996 | Chalfant | .......... 280/242.1 |
| 5,860,660 A | | 1/1999 | Garcia | |
| 6,120,048 A | * | 9/2000 | Li | .......... 280/270 |
| 6,193,253 B1 | * | 2/2001 | Barnett | .......... 280/234 |
| 2007/0164534 A1 | * | 7/2007 | Simon | .......... 280/242.1 |

OTHER PUBLICATIONS

Pivit, Rainer, My Bicycle, My Allround-Bicycle (online source: www.lustaufzukunft.de/pivit/fahrrad/my_bike_engl.html), downloaded Aug. 23, 2005, pp. 1-14, Germany.

* cited by examiner

*Primary Examiner*—Paul N Dickson
*Assistant Examiner*—Marc A Scharich
(74) *Attorney, Agent, or Firm*—Craig Miles; CR Miles P.C.

(57) ABSTRACT

A cycle direction control which pivotally couples each of the opposed ends of an axle to a corresponding one each of a pair of members which operate in directionally opposed travel to control direction of an annular member which rotates about the axis of the axle.

10 Claims, 13 Drawing Sheets

CYCLE DIRECTION CONTROL SYSTEM

BACKGROUND

A cycle direction control which pivotally couples each of the opposed ends of an axle to a corresponding one each of a pair of members which operate in directionally opposed linear travel to control direction of an annular member which rotates about the axle.

Conventional cycles typically provide a front fork having two blades to which the opposed ends of an axle are fixedly coupled proximate to the lower ends. The upper ends of the two blades are each connected to a fork crown from which the steerer upwardly projects. The steerer passes through a head tube of the cycle frame and can be made rotationally responsive to a handlebar. Rotation of the handlebar generates rotation of the steerer inside the head tube and in turn generates travel of the two blades in a circular travel path. Travel of the two blades in the circular travel path variably locates each of the opposed ends of the axle fixedly coupled to lower ends of the two blades. Variable location of the axle ends by travel of the two blades in the circular travel path allows direction control of an annular member which rotates about the axle between the two blades.

While there is a large commercial market for cycles which utilize the conventional steering assembly above-described and while a variety of improvements to this conventional steering assembly have been made over the past one-hundred years, long felt but unresolved problems remain with respect to the above-described conventional steering assembly.

A significant problem with conventional cycle steering assemblies can be that directional control of the annular member requires the cycle operator to engage the grips of a handlebar connected to a steerer which is rotationally coupled to the head tube of the cycle frame. This constraint can limit the useful range of locations in which the grips of the handlebar can be established for use by the cycle operator. This limitation as to the location of the grips of the handlebar of conventional cycle steering assemblies can preclude construction forms of the cycle frame which places the grips at a more advantageous location along the frame of the cycle.

A related problem with conventional cycle steering assemblies can be that operation of the handlebar grips about the axis of the steerer requires a portion of the upper body of the cycle operator to travel in conformance to the travel of the handlebar grips in the respective arcuate travel paths. This can involve rotation of the upper body proximate to the waist as well as forward extension of a first shoulder and arm and backward contraction of the second shoulder and arm. All of which can requires additional coordination of the cycle operator as opposed to simple linear motion of the grip forward and backward which would correspondingly limit travel of the upper body and arms of the cycle operator.

Another significant problem with conventional cycle steering assemblies can be that forces transferred from the support surface to the annular member rotating between the pair of blades is directed primarily to the head tube of the cycle. Because these operational forces are not disseminated across a larger portion of the cycle frame the crown, steerer, and head tube each must be configured with sufficient strength to receive these operational forces. Configuring the crown, steerer, and head tube to receive these undisseminated operational forces can add a significant amount of weight to the cycle.

Embodiments of the cycle direction control invention described herein addresses each of these problems.

SUMMARY OF THE INVENTION

Accordingly, a broad object of the invention can be to provide a cycle direction control which generates opposed directional rotation of a pair of axle ends about a corresponding pair of pivot axes to control direction of an annular member which rotates about the axis of the axle between a pair of members.

A further broad object of the invention can be to provide at least one directional control element which generates opposed reciprocal linear travel in a pair of members each the pair of members having a second member end pivotally coupled to a corresponding one each of the pair of axle ends.

A further broad object of the invention can be to provide a frame member and at least one directional control element which operationally engage to allow sufficient amount of linear travel of the at least one directional control element to generate a corresponding amount of linear travel of at least one member about which the axle can rotationally travel.

A further broad object of the invention can be to provide a frame which receives forces generated by engagement of the annular member of the cycle with a support surface closer to the longitudinal center of the frame rather than proximate to the end of the frame.

A further broad object of the invention can be to avoid the use of a conventional fork having a pair of blades which travel in a circular travel path in response to rotation of a steerer within a head tube.

A further broad object of the invention can be to provide a frame member which avoids use of and eliminates in whole or in part the weight contributed by a conventional head tube, steerer, or handle bars.

Naturally, further objects of the invention are disclosed throughout other areas of the specification, drawings, and claims.

A BRIEF DESCRIPTION OF THE DRAWINGS

DETAILED DESCRIPTION OF THE PREFERRED EMBODIMENTS

A cycle direction control which pivotally couples each of the opposed ends of an axle to a corresponding one each of a pair of members which operate in directionally opposed linear travel to control direction of an annular member which rotates about the axis of the axle.

Figure 1:
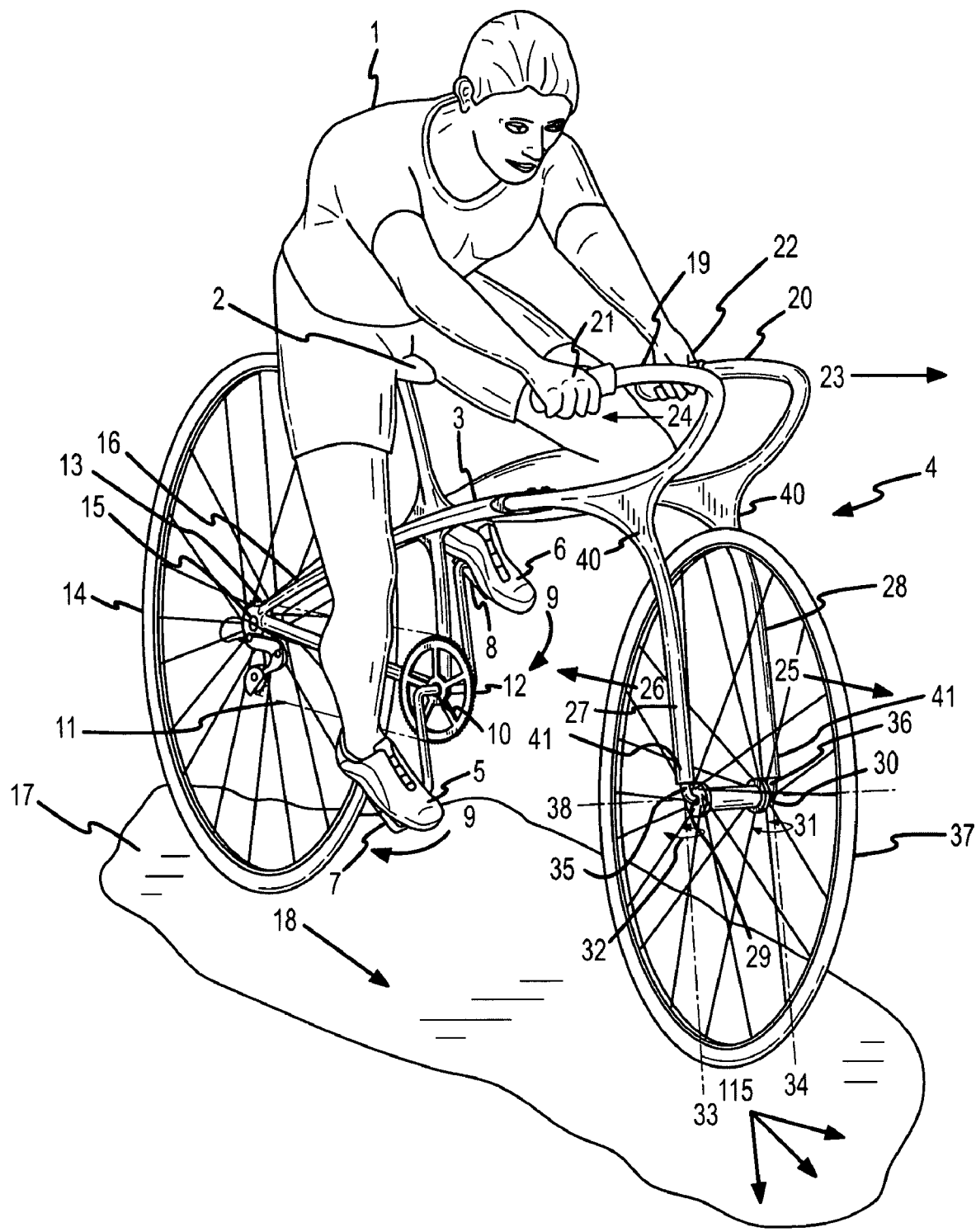
FIG. 1 is a perspective view showing a method of using a particular embodiment of the invention to control direction of an annular member which rotates about the axis of an axle.

First referring primarily to FIG. 1, a particular embodiment of the invention provides a cycle operator (1) supported by an operator support element (2) coupled to a frame (3) of a cycle (4). By engaging each one of a pair of feet (5)(6) to a corresponding one each of a pair of pedals (7)(8) the cycle operator (1) can by rotational reciprocation (9) of the pair of pedals (7)(8) coupled to opposed ends of a shaft (10) drive a circuitous force transfer element (11) which engages at least two rotation means (12)(13) with a first rotation means (12) responsive to rotation of the shaft (10) and a second rotation means (13) coupled to a second annular member (14). By generating rotation of the shaft (10) by corresponding rotational reciprocation (9) of the pair of pedals (7)(8) by the cycle operator (1), circuitous travel of the circuitous force transfer element (11) in a circuitous travel path about the at least two rotation means (12)(13) can generate rotation of the second annular member (14) between a pair of forks (15)(16). By engaging a support surface (17) with the second annular member (14) during rotation forward travel (18) of the cycle (4) can be generated.

By gripping at least one of a pair of direction control elements (19)(20) with a corresponding at least one of a pair of hands (21)(22), the cycle operator (1) can generate a measure of opposed reciprocal travel (23)(24) in the pair of direction control elements (19)(20). Generating the measure of opposed reciprocal travel (23)(24) in the pair of direction control elements (19)(20) can provide a corresponding measure of directionally opposed linear travel (25)(26) in a pair of members (27)(28). Pivotally coupling each of the pair of members (27)(28) to a corresponding one each of a pair of axle ends (29)(30) allows rotation (31)(32) of the pair of axle ends (29)(30) about a corresponding pair of pivot axes (33) (34) of a pair of pivot elements (35)(36). By rotating (31)(32) each of the pair of axle ends (29)(30)(see also FIGS. 19-22) about a corresponding one each of the pair of pivot axes (33)(34) of the corresponding one each of the pair of pivot elements (35)(36) responsive to the directionally opposed linear travel (25)(26) of the pair of members (27)(28), each of the pair of axle ends (29)(30) can be controllably located by the cycle operator (1) to alter direction of travel (115) of a first annular member (37) which rotates between the pair of members (27)(28) to steer the cycle (4).

Naturally, the above-described method will vary consistent with the particular configuration of the cycle (4) which incorporates the direction control invention and the above-described method is not intended to limit the various methods by which the invention can be utilized to generate rotation (31) (32) of each of a pair of axle ends (29)(30) about a corresponding pair of pivot axes (33)(34) in response to a measure of directionally opposed linear travel (26)(27) of a corresponding pair of members (27)(28) to alter direction (15) of one or more annular members (37) rotatable between the pair of members (27)(28).

The term "cycle operator" as used herein refers to any human, animal, apparatus, other entity which operates the direction control invention and while FIG. 1 shows a human operating the invention, the invention is not so limited.

The term "cycle" as used herein refers to any manner of steerable apparatus which can incorporate the direction control invention described herein and while the figures show the direction control invention utilized with various types of bicycles it is not intended that the direction control invention be so limited. Rather, the various bicycles shown by the figures are intend to be illustrative of the numerous and varied steerable apparatus which can be directionally controlled by incorporating the invention, such as bicycles, tricycles, quadracycles, or otherwise.

Figure 2:
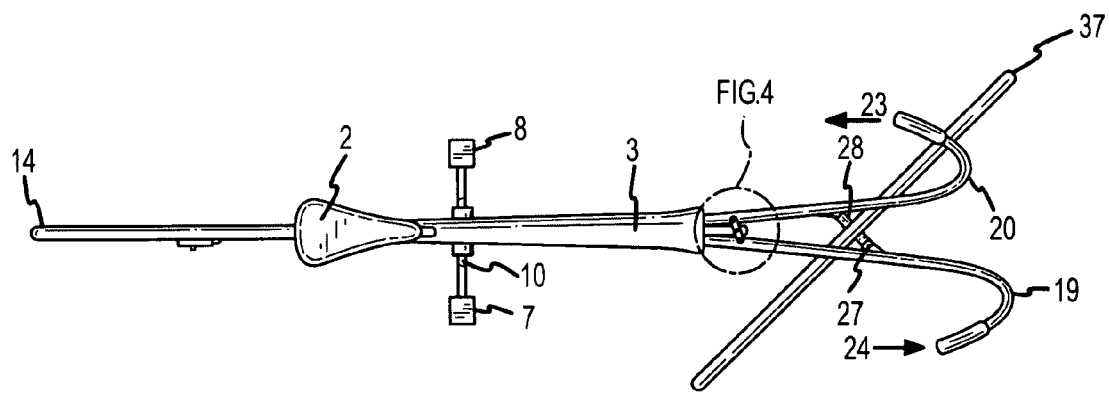
FIG. 2 is a top view of a particular embodiment of the invention to control direction of an annular member which rotates about the axis of an axle.
Figure 3:
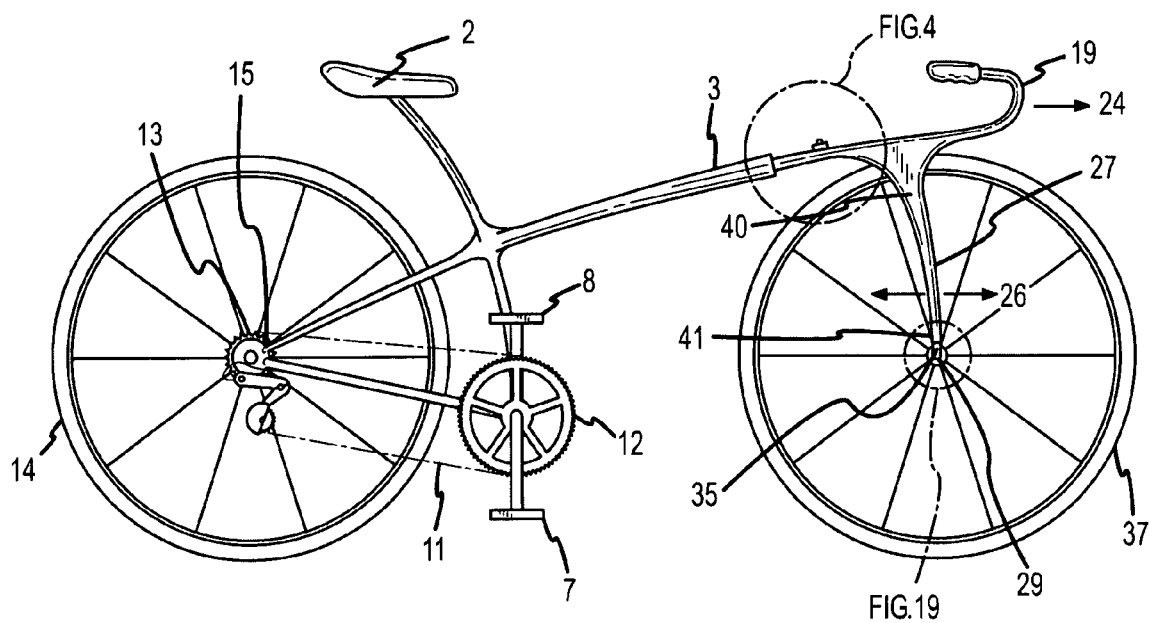
FIG. 3 is a side view of a particular embodiment of the invention to control direction of an annular member which rotates about the axis of an axle.
Figure 14:
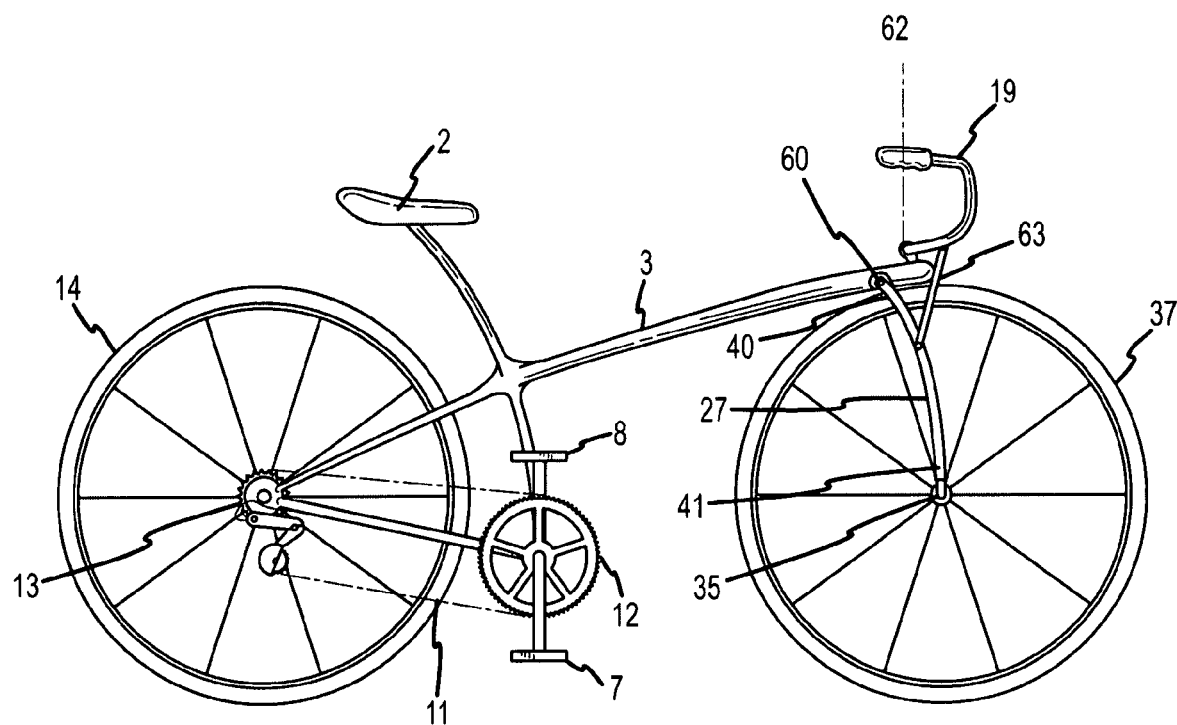
FIG. 14 is a side view of another particular embodiment of the invention to control direction of an annular member which rotates about the axis of an axle.
Figure 15:
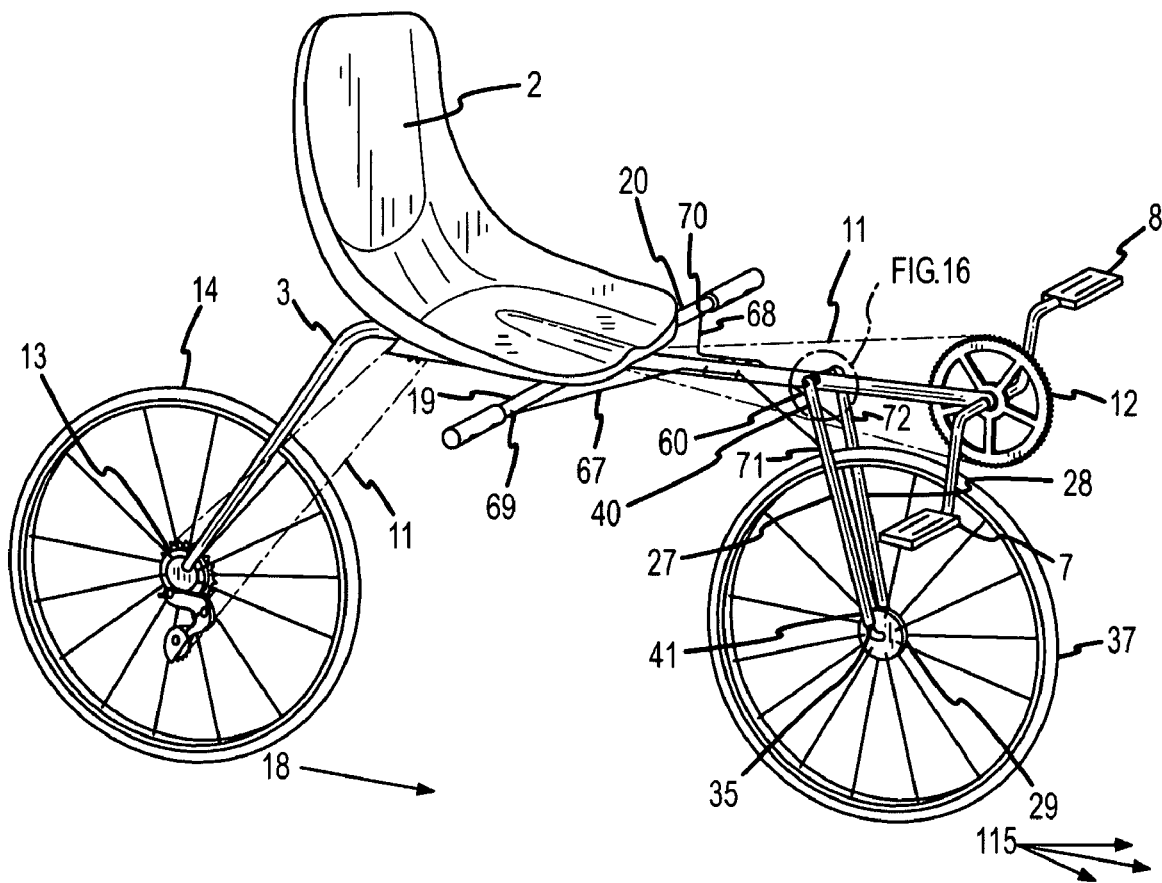
FIG. 15 is a perspective view of another particular embodiment of the invention to control direction of an annular member which rotates about the axis of an axle.
Figure 16:
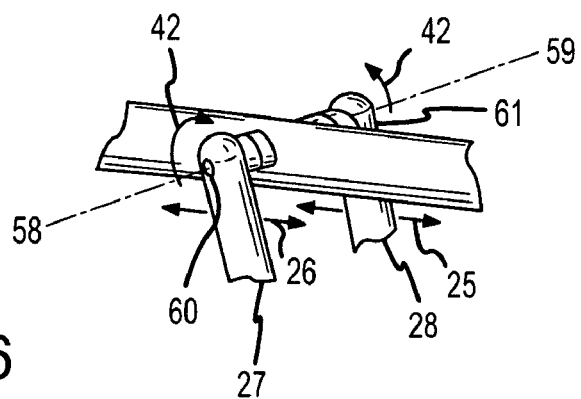
FIG. 16 is an enlarged view of a portion of the perspective view shown by FIG. 20.
Figure 17:
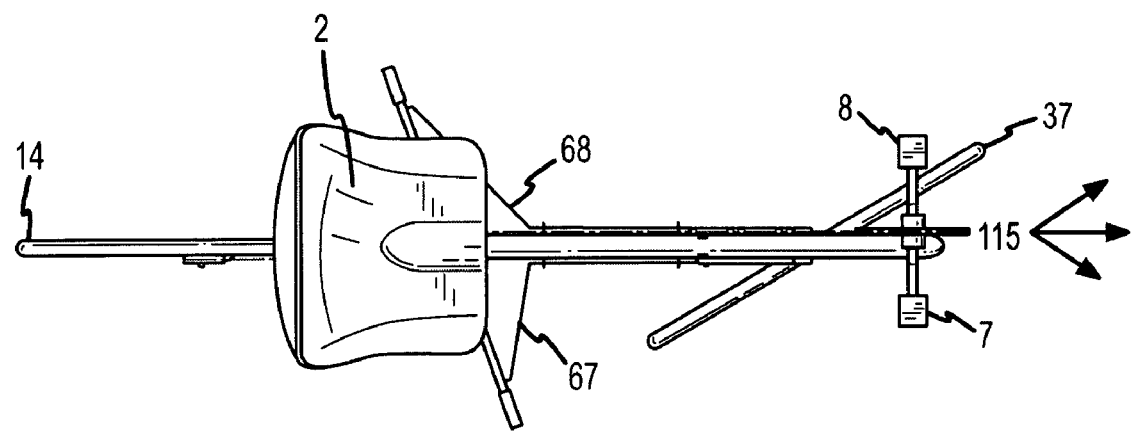
FIG. 17 is a top view of another particular embodiment of the invention to control direction of an annular member which rotates about the axis of an axle.
Figure 18:
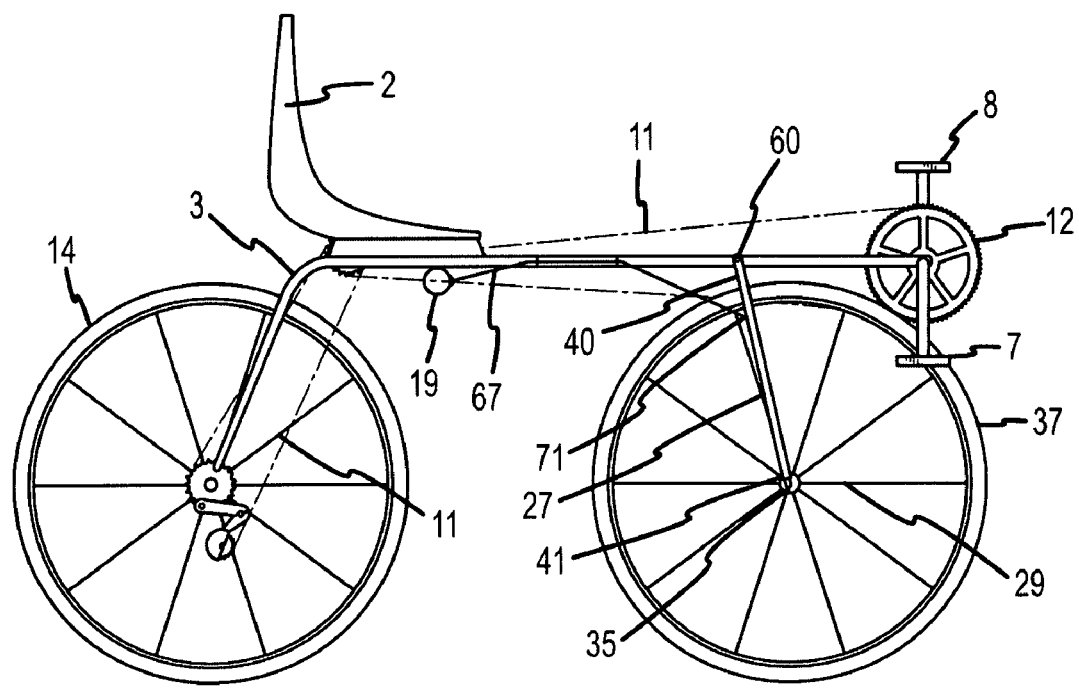
FIG. 18 is a side view of another particular embodiment of the invention to control direction of an annular member which rotates about the axis of an axle.
Figure 19:
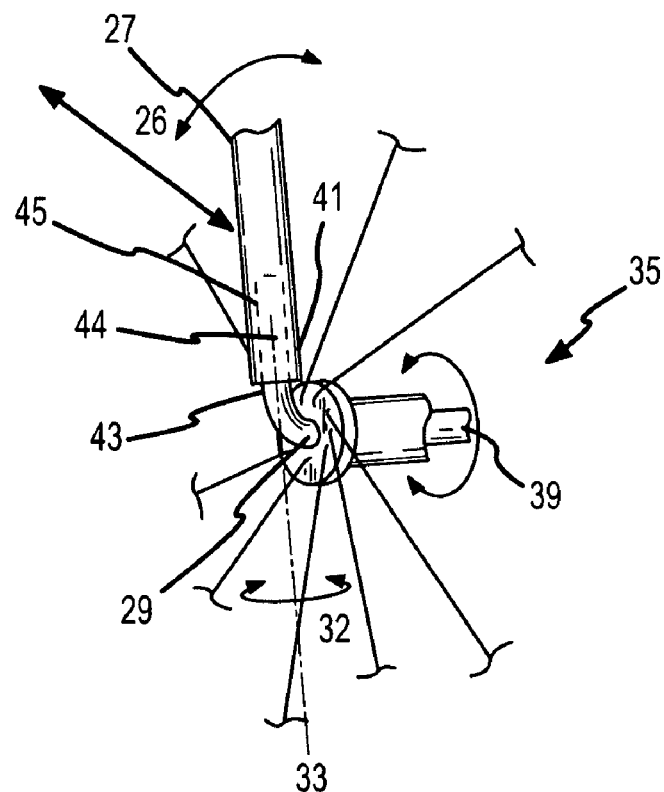
FIG. 19 is an enlarged view of a portion of the particular embodiment of the invention shown by FIG. 3 which shows one of various embodiments of a pivot element which can couple an axle end to a corresponding member end.

The term "operator support element" as used herein refers to any configuration of support which can engage a portion of the cycle operator (1) which allows operation, whether directly or indirectly, of the direction control invention by the cycle operator (1) and can include without limitation a conventionally configured bicycle seat such as shown by FIGS. 2 and 3, or a bucket type seat as shown by FIG. 14, or other type of support which engages a portion of the cycle operator (1). As to certain embodiments of the invention, the cycle operator may be supported by foot pegs or other type of support which engages a portion of the anatomy of the cycle operator other than the back or bottom, all of which are intended to be encompassed by the term "operator support element".

Moreover, while embodiments of the invention shown by the figures are powered by anatomical movement of the cycle operator (1) such as reciprocating rotational travel of the feet (5)(6) as above-described, it is not intended the invention be so limited. Rather, any manner, means, or method which can generate rotation of the first annular member (37) or the second annular member (14), or both, consistent with utilization of embodiments of the directional control invention described herein can be encompassed by the invention, including, without limitation, reciprocal travel of the hands (21)(22) which can drive embodiments of the circuitous force transfer element (11), or a reciprocal piston engine, electric motor, or the like, whether directly engaged or indirectly engaged to the first annular member (37) or the second annular member (14), or both.

The term "gripping" as used herein refers to engagement by the cycle operator with at least one direction control element (such as (19) or (20) or both), whether directly or indirectly.

The term "opposed reciprocal linear travel" as it relates to the pair of members (27)(28) provides a first of the pair of members (27) a first linear travel path (25) and the second of the pair of members (28) a second linear travel path (26). The direction of travel of the first of the pair of members (27) in the first linear travel path (25) and the direction of travel of the second of the pair of members (28) in the second linear travel path (26) can occur in opposite directions to establish the second member end (41) of the first of the pair of members (27) at a location in the first linear travel path (25) and to establish the second member end (41) of second of the pair of members (28) at a location in the second linear travel path (26). Travel of the second member ends (41) in the corresponding first linear travel path (25) and second linear travel path (26) can be parallel linear travel to establish the second member ends (41) a distance apart (93). The distance (93) between the second member ends (41) can vary dependent upon the location of each of the pivotally coupled pair of axle ends (29)(30). Understandably, the term "linear travel" encompasses a certain amount of variation due to the mechanical operation of the components which make up the directional control system of the invention and can encompass embodiments of the invention which provide substantially linear travel of the pair of members (27)(28). Moreover, a measure of opposed reciprocal linear travel can be any amount or measure of travel in a member which may be desirable to generate an amount of rotation of the pair of axle ends (29)(30) of the axle (39) to achieve a desired alteration of direction (115) of the first annular member (37) or the second annular member (14), or both, and can include a lesser measure or amount of linear travel in a member (27) or (28) or both sufficient to maintain a fixed direction of travel (115) of an annular member (14)(37) or a greater measure or amount of travel in a member (27) or (28) or both to alter direction of travel (115) of an annular member (14) (37). The use of the term "opposed reciprocal linear travel" is also not intended to preclude embodiments of the invention in which only one of the pair of members (27)(28) travels in the corresponding first linear travel path (25) or second linear travel path (26) while the other of the pair of members (27)(28) remains at a fixed location.

The term "annular member" as used herein is intended to encompass any object configured to rotate about the axis (38) of an axle (39)(see for example FIG. 22) between a pair of members (27)(28) to allow forward travel (18) of a cycle (4) on a support surface (17) including without limitation a wheel, a bicycle wheel, a spoked rim engaged to an annular tire, a pair of wheels, a plurality of wheels, or the like.

Figure 5:
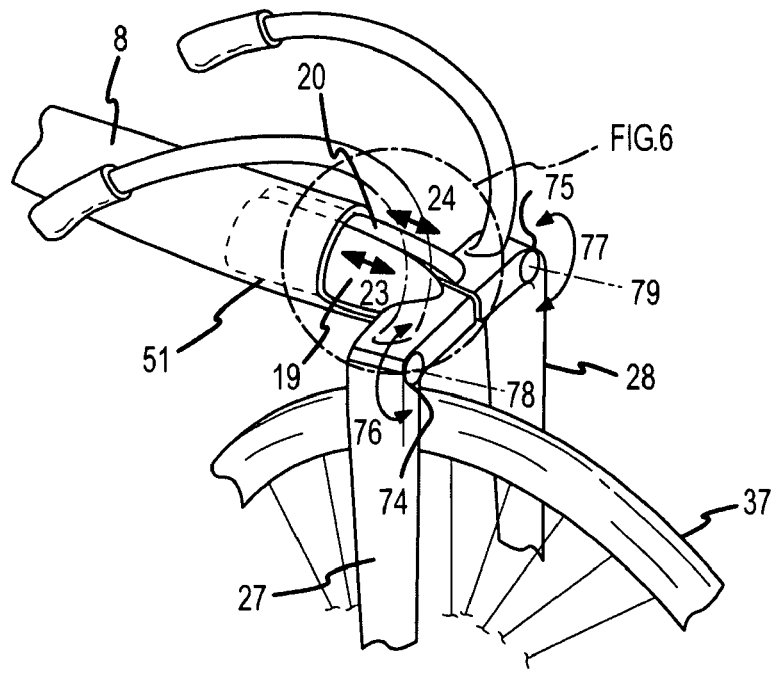
FIG. 5 is a perspective view of a particular embodiment of the invention which provides a pair of members which operate in directionally opposed linear travel to control direction of an annular member which rotates about the axis of the axle.
Figure 8:
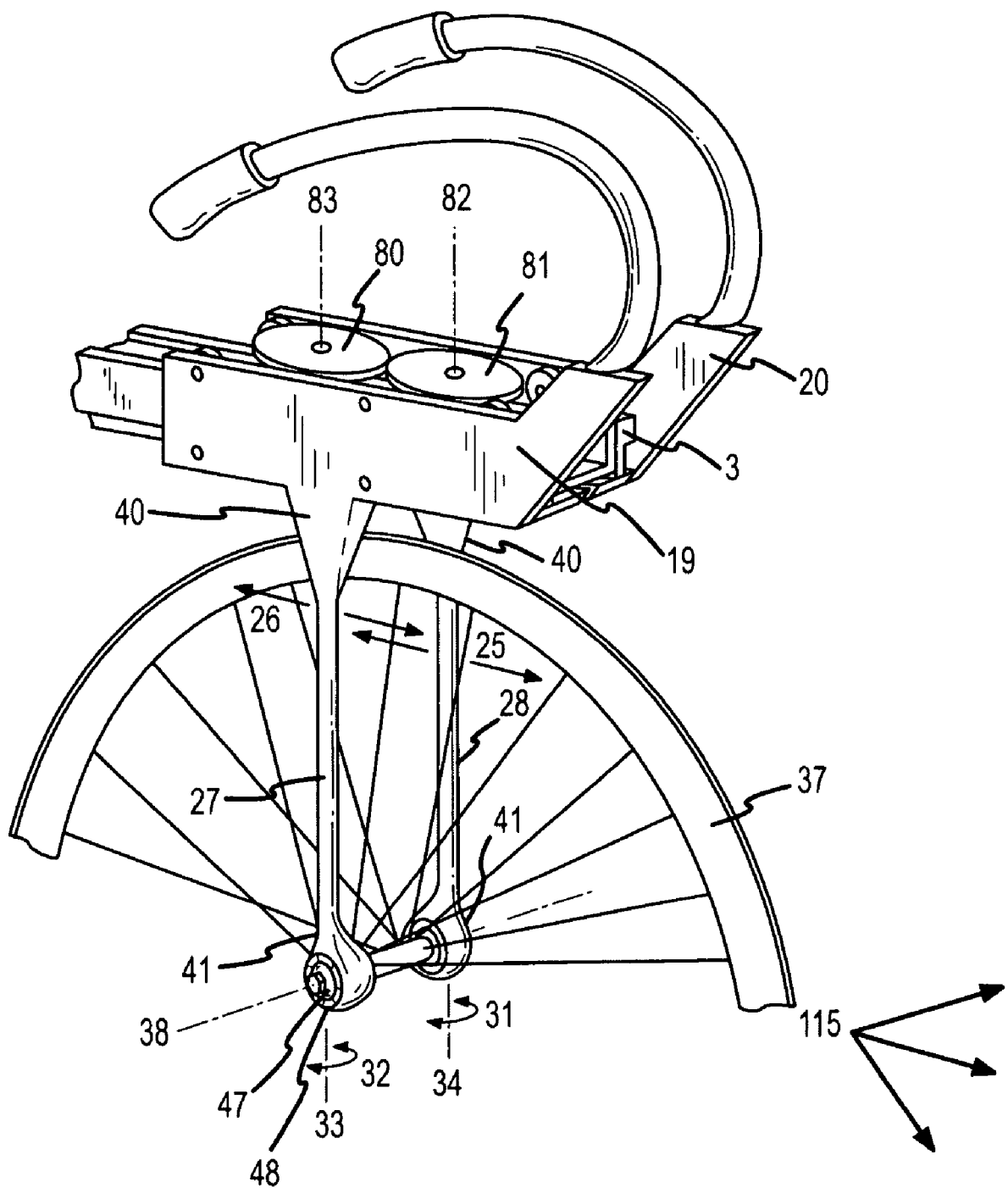
FIG. 8 is a perspective view of another particular embodiment of the invention which provides a pair of members
Figure 20:
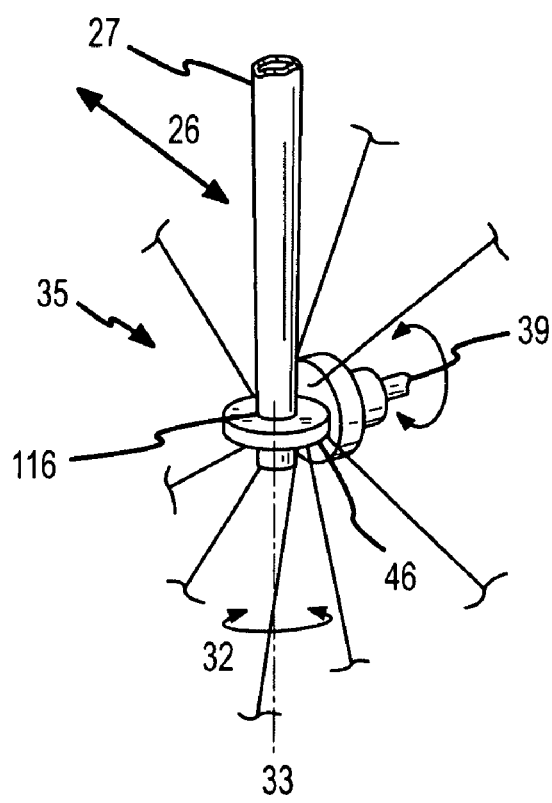
FIG. 20 is an enlarged view of a portion of the particular embodiment of the invention shown by FIG. 3 which shows another one of various embodiments of a pivot element which can couple an axle end to a corresponding member end.

Now referring primarily to FIGS. 2 and 3, a particular embodiment of the direction control invention can include a pair of members (27)(28) each of which provides a first member end (40) and a second member end (41). The pair of members (27)(28) can be configured in any manner which allows the axle ends (29)(30) of the axle (39) to be pivotally joined to provide rotation (31)(32) of the axle ends (29)(30) about corresponding pivot axes (33)(34) of a pair of pivot elements (35)(36) and which can further allow rotation of an annular member (37) between the pair of members (27)(28). For example, the pair of members (27)(28) can each be a cylindrical solid as shown by FIG. 8, or can each be a cylindrical tube as shown by FIG. 20, or can each be a substantially rectangular solid or tube as shown by FIG. 5, or each can be an arcuate tube as shown by FIGS. 1-3. And while each of the examples show a pair of members (27)(28) each having similar constructional form, the invention is not so limited, and each of the pair of members (27)(28) can provide a discrete constructional form or configuration. The pair of members (27)(28) and the frame (3) can be produced from a wide variety of materials such as steel, aluminum, titanium, carbon fiber, or the like.

Now referring primarily to FIGS. 2-3 and 19-22, the pair of pivot elements (35)(36) can pivotally join a corresponding axle end (29)(30) to each of the pair of members (27)(28) (typically at or proximate to the second member end (41)). Now specifically referring to FIG. 19, a non-limiting example of a pair of pivot elements (35)(36)(only one of the pair shown) provides a pivot shaft (43) having first pivot shaft end (44) rotatably coupled to the second member end (41) and second pivot shaft end (50) coupled to one of the pair of axle ends (29) or (30). The second member end (41) can be configured to provide a cylindrical closed end tube (45) into which the first pivot shaft end (44) inserts to rotatably engage the surface defined by the cylindrical closed end tube (45) to the corresponding external surface of the first pivot shaft end (44). Alternately, bushings, bearings, or other friction reduction element(s) can be utilized to reduce rotational friction between the rotationally coupled surfaces of the first pivot shaft end (44) the closed end tube (45).

Now specifically referring to FIG. 20, a second non-limiting example of a pair of pivot elements (35)(36)(only one of the pair shown) provides an aperture element (116) in which the second member end (41) inserts to rotatably couple (31) (32) one of the pair of axle ends (29)(30). The aperture element (116) can, for example, traverse between a first and second surface of a cylindrical disk (46) coupled to one of the pair of axle ends (29)(30) to establish the surfaces which rotationally engage the corresponding external surface of a cylindrical second member end (41). Again, bushings, bearings or other friction reduction elements can be utilized to reduce frictional engagement between the rotationally coupled surfaces.

Figure 21:
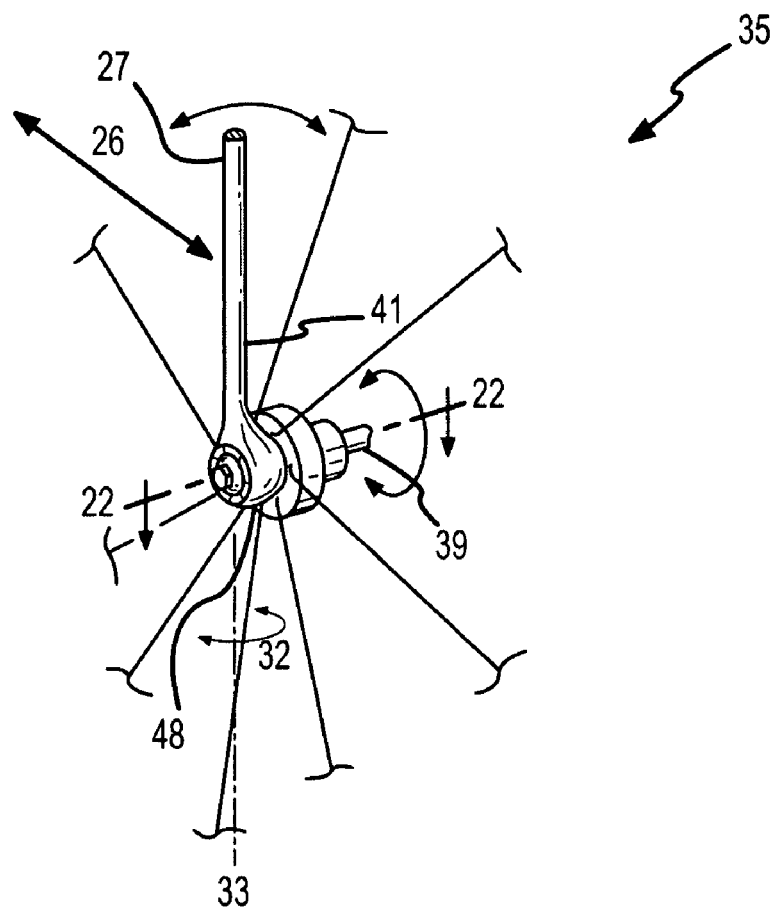
FIG. 21 is an enlarged view of a portion of the particular embodiment of the invention shown by FIG. 3 which shows another one of various embodiments of a pivot element which can couple an axle end to a corresponding member end.
Figure 22:
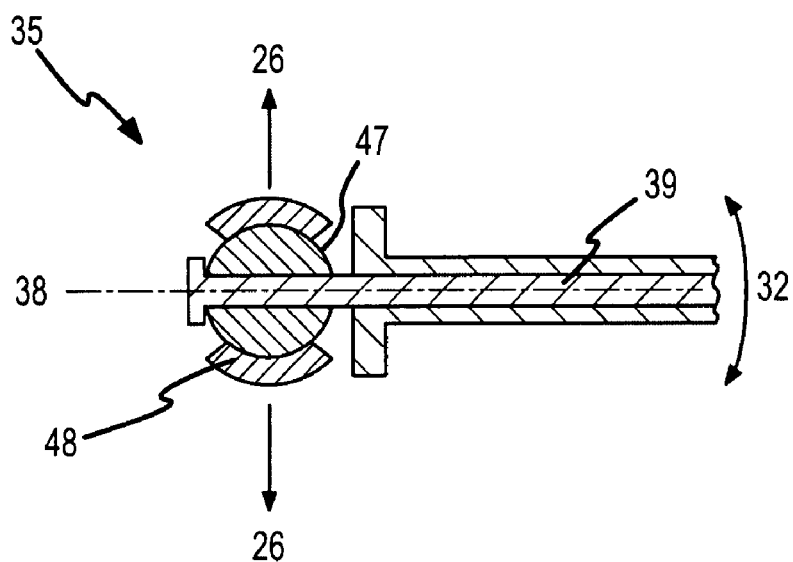
FIG. 22 is a cross section 22-22 shown by FIG. 21 of the particular embodiment of a pivot element shown by FIG. 21 which can couple an axle end to a corresponding member end.

Now specifically referring to FIGS. 21 and 22, a third non-limiting example of a pair of pivot elements (35)(36) (only one of the pair shown) provides a spherical element (47) which rotationally engages a surface of a spherical socket (48). Again bushings, bearings or other frictional reduction elements can be utilized to reduce friction between the rotationally coupled surfaces of the spherical element (47) and the spherical socket (48).

As to each of the non-limiting examples of the pair of pivot elements (35)(36) shown by FIGS. 19-22, or as to each similar or equivalent functional or constructional form of the pair of pivot elements (35)(36) which may be utilized, a measure of directionally opposed linear travel (25)(26) of the pair of members (27)(28) can generate an amount of rotation (31)(32) of the pair of axle ends (29)(30) about the corresponding pair of pivot axes (33)(34) of a pair of pivot elements (35)(36).

Now again referring primarily to FIGS. 2 and 3, the invention can further include a at least one directional control element (19)(20) coupled to a corresponding one each of the pair of members (27)(28), typically proximate to the first member end (40). The pair of directional control elements (19)(20) can be configured in a numerous variety of constructional forms depending upon the particular application so long as the pair of directional control elements (19)(20) can generate an amount of opposed linear travel in the corresponding pair of first member ends (40). As shown by FIG. 2, directionally opposed travel (23)(24) of the pair of directional control elements (19)(20) can generate directionally opposed linear travel (25)(26) in each of the pair of second member ends (41) which acts to generate an amount of rotation (31)(32) of the pair of axle ends (29)(30) about a corresponding one each of a pair of pivot axes (33)(34) of the pair of pivot elements (35)(36) to control direction (115) of the first annular member (37) between said pair of members (27)(28). While the embodiment of the invention shown by FIGS. 2 and 3 provide a pair of directional control elements (19)(20), the invention is not so limited, and certain embodiments of the invention can provide one, or at least one directional control element, or a plurality of control elements as necessary or desired to generate linear travel in each of the corresponding pair of members (27)(28) to generate an amount of rotation (31)(32) in the pair of axle ends (29)(30) about a corresponding one each of a pair of pivot axes (33)(34) of the pair of pivot elements (35)(36).

Figure 4:
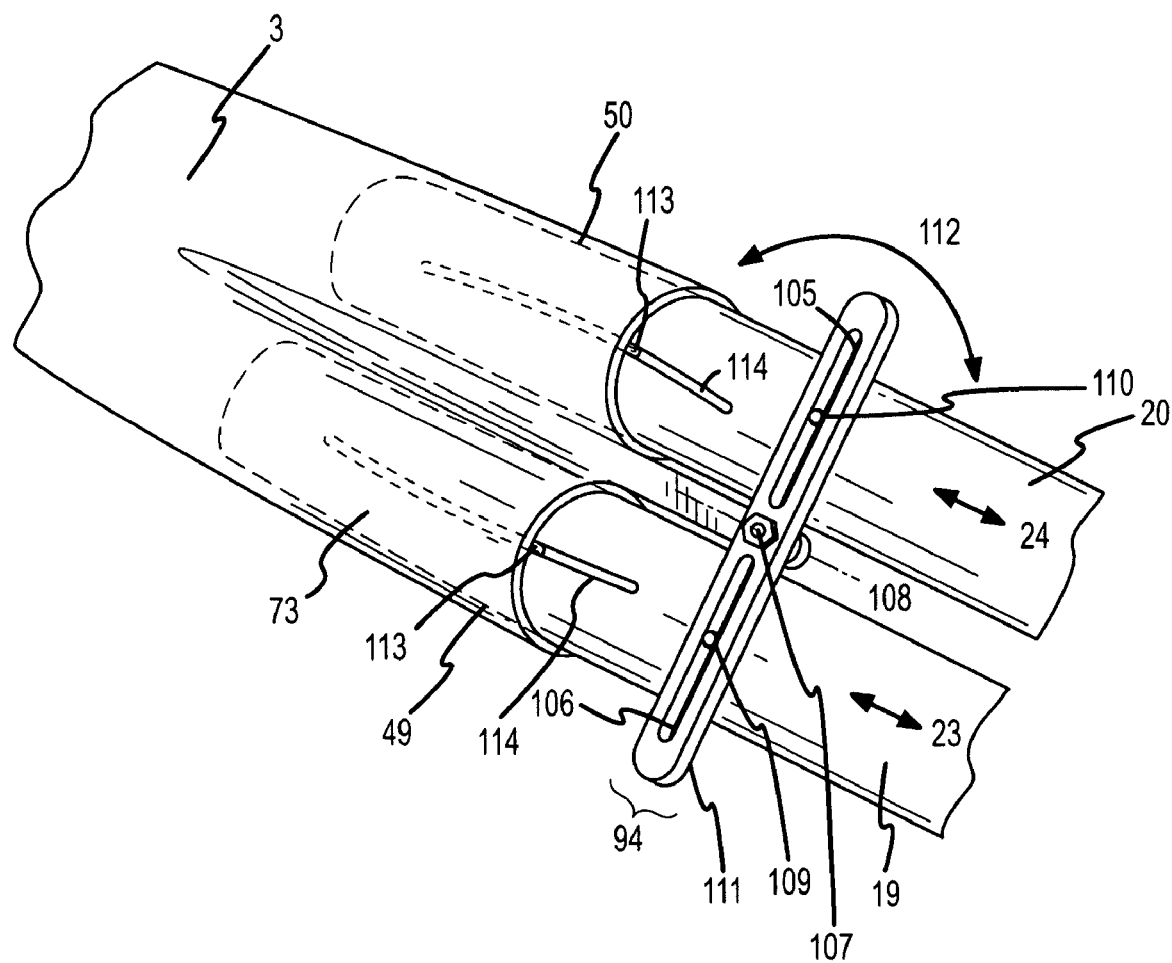
FIG. 4 is an enlarged view of a portion of the particular embodiment of the invention shown by FIGS. 3 and 4 to control direction of an annular member which rotates about the axis of an axle.

Now referring primarily to FIG. 4, the embodiment of the invention shown by FIGS. 2 and 3 can further provide a frame member (3) which engages each of the pair of direction control elements (19)(20) (or engages the at least one direction control element) to allow opposed reciprocal travel of the pair of direction control elements (19)(20) (or travel of the at least one direction control element) to generate linear travel (25)(26) in the corresponding coupled pair of members (27)(28) which in turn generates an amount of rotation (31)(32) in the pair of axle ends (29)(30) about a corresponding one each of a pair of pivot axes (33)(34) of the pair of pivot elements (35)(36) to control direction (115) of the annular member (37) which rotates between the pair of members (27)(28). As to certain embodiments of the invention as shown in FIGS. 1-7, engagement of the frame member (3) with the pair of directional control elements (19)(20) (or at least one directional control element) can comprise slidable (engagement which allows each of the opposed surfaces to travel with respect to the other) or telescopic engagement of a pair of direction control elements (19)(20) which can be either discrete telescopic engagement of each one of the pair direction control elements (19)(20) in a corresponding one each directional control element receiver (49)(50) (as shown by hash mark lines in FIG. 4) or mutual telescopic engagement of both of the pair of direction control elements in a single directional control receiver (51) (as shown by hash mark lines in FIG. 5). As to the embodiment of the invention shown by FIG. 4, each directional control element (19)(20) can further provide a track (114) in which a corresponding track element (113) travels. Each of the tracks (114) can provide a travel path which the track element (113) follows to limit rotation of each direction control elements (19)(20) within each corresponding direction control element receiver (49)(50) and as to certain embodiments of the invention adjust the distance (93) (see FIG. 9) between the pair of members (27)(28) as each axle end (29)(30) pivots about the corresponding pivot axis (33)(34) of the pair of pivot elements (35)(36).

Figure 9:
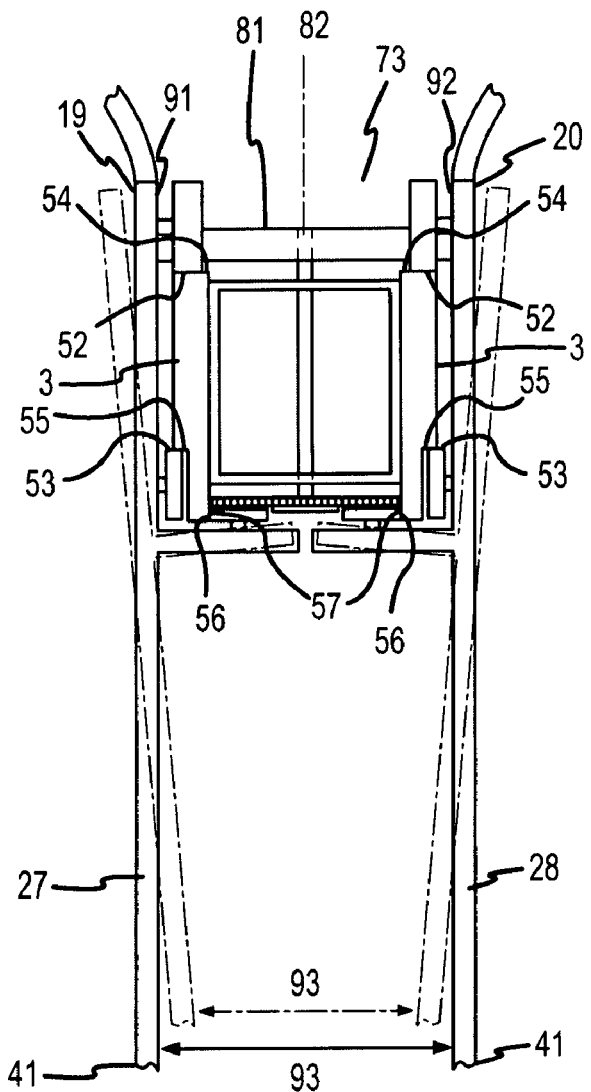
FIG. 9 is a front view of the particular embodiment of the invention shown by FIG. 8.
Figure 10:
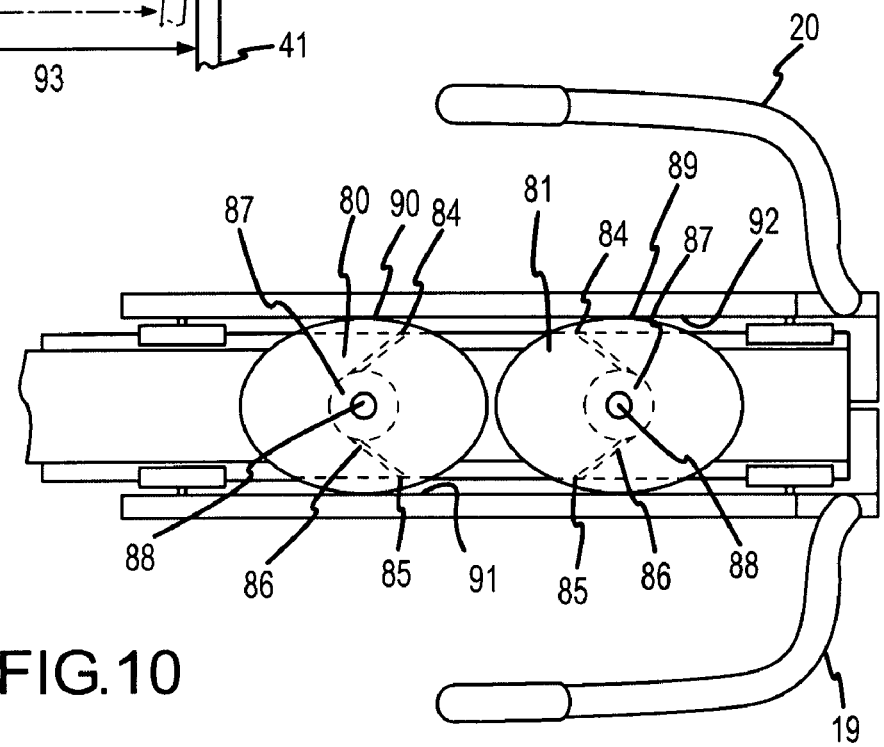
FIG. 10 is a top view of the particular embodiment of the invention shown by FIG. 8.
Figure 11:
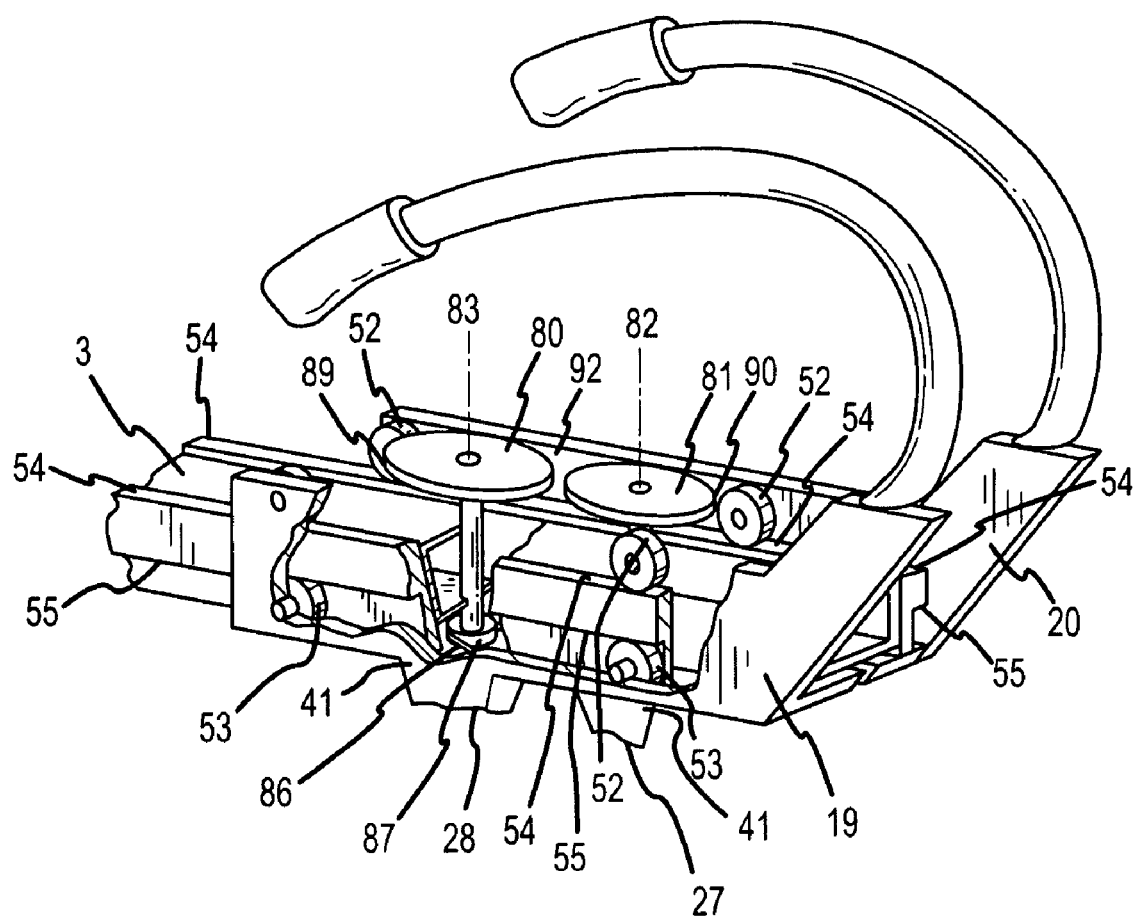
FIG. 11 is a cut away view of the particular embodiment of the invention shown by FIG. 8 showing an embodiment of an opposed reciprocal travel coordinator which maintains substantially equal measure of opposed reciprocal travel of each one of the pair of members.

Now referring primarily to FIGS. 8-11, as to certain embodiments of the invention, the pair of direction control elements (19)(20) can slidly engage (engagement which allows each of the opposed surfaces to travel with respect to the other) the external surface of the frame member (3). For example as shown by FIGS. 9 and 11, each of the pair of direction control elements (19)(20) can provide a first horizontal frame engagement surface (52) and a second horizontal frame engagement surface (53) located in opposed relation a distance apart to engage a corresponding first horizontal frame surface (54) and a second horizontal frame surface (55) providing each of the pair of direction control elements (19)(20) slidable mated engagement to the external surface of the frame (3). Each of the pair of direction control elements (19)(20) can further provide a vertical frame engagement surface (56) which slidly engages (engagement which allows each of the opposed surfaces to travel with respect to the other) a vertical frame surface (57) to maintain slidable engagement of the first horizontal frame engagement surface (52) and the second horizontal frame engagement surface (53) with first horizontal frame surface (54) and the second horizontal frame surface (55). As shown by FIGS. 9-11, the first horizontal frame engagement surface (52) and the second horizontal frame engagement surface (53) can comprise the surface of an annular bearing surface such as a plurality of roller bearings which travel on the corresponding first horizontal frame surface (54) and the second horizontal frame surface (55). Similarly, the vertical frame engagement surface (56) can comprise an annular bearing surface such as a plurality roller bearings which engage the vertical frame surface (57).

While several particular examples of slidly engaging a pair of directional control elements (19)(20) to the frame (3) of the cycle (4) are shown, it is not intended that these several examples be limiting with respect the numerous and varied constructional forms by which one, at least one, a pair, or a plurality of directional control elements could be engaged to a frame member (3) to allow the one, at least one, a pair, or plurality of directional control members to generate travel in the corresponding second member end(s)(27)(28) to generate an amount of rotation (31)(32) of the corresponding axle end(s)(29)(30) about the corresponding one each of the pair of pivot elements (35)(36) to alter direction of the first annular member (37) between the pair of members (27)(28).

Figure 12:
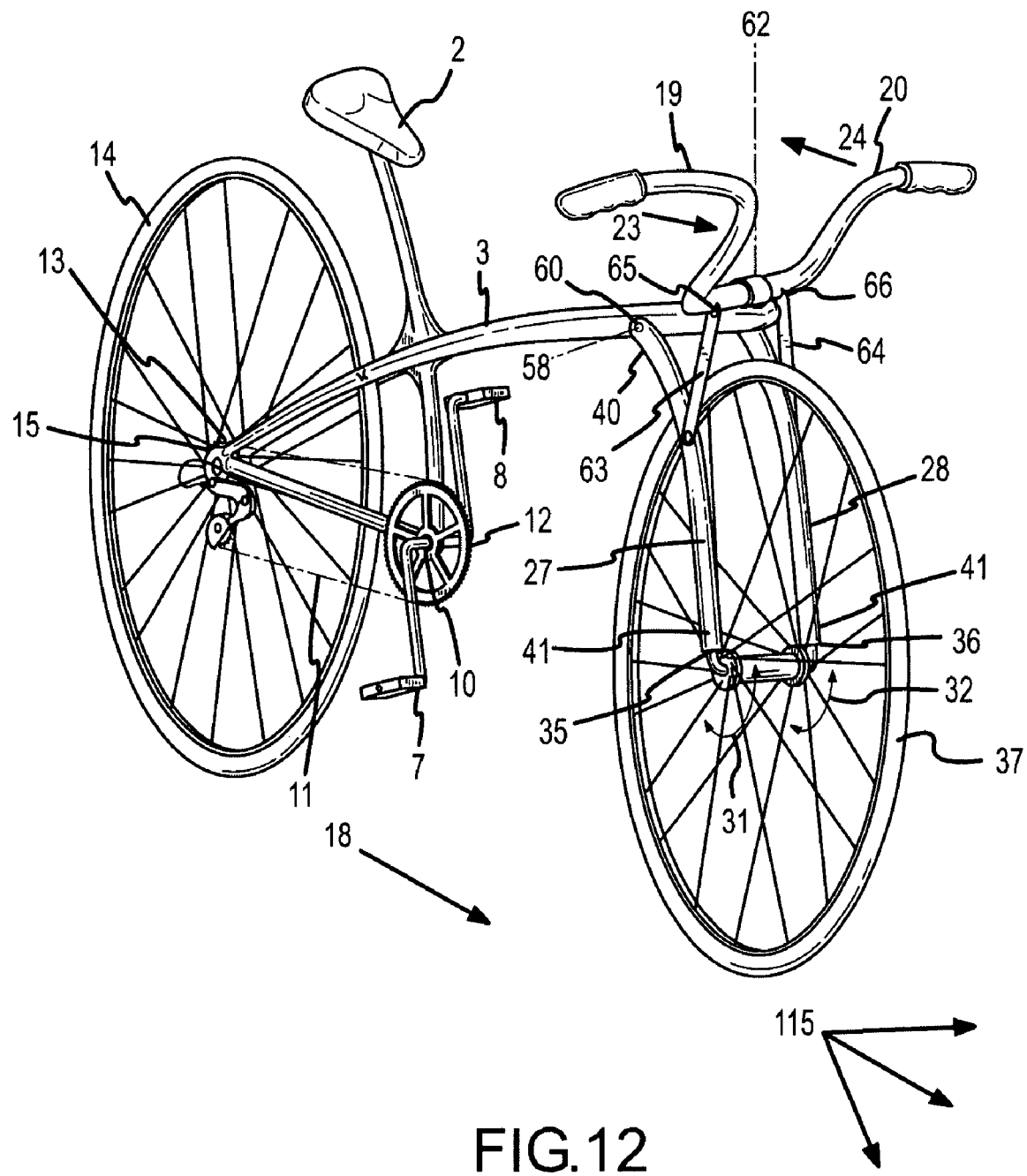
FIG. 12 is a perspective view of another particular embodiment of the invention to control direction of an annular member which rotates about the axis of an axle.
Figure 13:
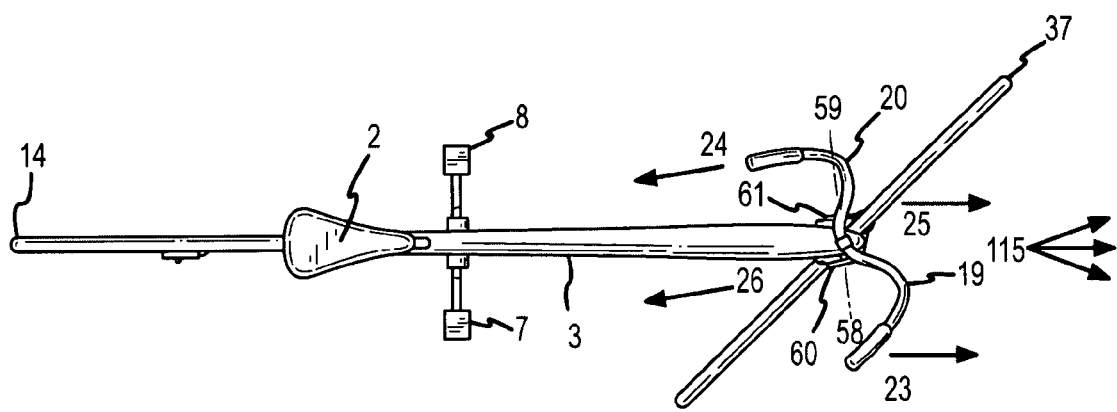
FIG. 13 is a top view of another particular embodiment of the invention to control direction of an annular member which rotates about the axis of an axle.

Now referring primarily to FIGS. 12-18, other embodiments of the invention can pivotally couple (see FIG. 16) each of the first member ends (40) to the frame (3) to allow each of the pair of members (27)(28) rotation (42) about a member end pivot axis (58)(59) of a corresponding member end pivot (60)(61) (see FIG. 16) generating directionally opposed linear travel (25)(26)(see for example FIG. 13) in a pair of members (27)(28) to generate an amount of rotation (31)(32) in each of the pair of pivotally coupled axle ends (29)(30) about the corresponding one each of the pair of pivot elements (35)(36). Opposed reciprocal travel (23)(24) in the pair of direction control elements (19)(20) about a directional control pivot axis (62) can generate corresponding travel in a corresponding pair of directional control linkage elements (63)(64). For example as shown by FIG. 12, the pair directional control linkage elements (63)(64) can each be joined at a first linkage element end (65)(66) to a corresponding one each of the pair of directional control elements (19)(20) and pivotally joined to a corresponding one each of the pair of members (27)(28). Or for example as shown by FIGS. 15-18, a pair of cable elements (67)(68) can each joined at a first cable end (69)(70) to a corresponding one each of the direction control elements (19)(20) and joined at a second cable end (71)(72) to a corresponding one each of the pair of members (27)(28) to generate reciprocally opposed liner travel (25)(26) of the member which as above-described can generate an amount of rotation (31)(32) of each of a pair of axle ends (29)(30) about each of a pair of pivot axes (33)(34).

Now referring primarily to FIGS. 5 and 8-11, embodiments of the invention can further provide a second member end location compensator (73). As linear travel of the pair of members (27)(28) generates an amount of rotation (31)(32) of the pair of axle ends (29)(30) about the corresponding pivot axes (33)(34), the amount of distance (93) between the pair of members (27)(28) can vary. This variation in the amount of distance (93) between the pair of members (27)(28) can be compensated by providing one of various constructional forms of the second member end location compensator (73).

Now referring primarily to FIG. 5, a particular embodiment of a second member end location compensator (73) provides a pair of first member end pivots (74)(75) which allows the distance (93) between the pair of second members ends (41) to be increased or decreased as the pair of members (27)(28) linearly travel to generate opposed directional rotation (31)(32) of the pair of axle ends (29)(30). While the first member end pivots (74)(75) shown allow for rotation (76)(77) of each of the pair of members (27)(28) about a corresponding pair of first member end pivot axes (78)(79), the invention is not so limited, and the first member end pivots (74)(75) can each be configured to provide rotation of each of the pair of members (27)(28) about one, a pair of, a plurality of, or a variable adjustable pivot axis depending upon the application.

Now referring to FIGS. 8-11 an alternate embodiment of the second member end location compensator (73) is shown. Referring first to FIGS. 9 and 11, the rotation of at least one cam (80)(81) (for example, a pair of cams as shown by FIGS. 8-11) about a corresponding at least one cam axis (82)(83) can be made responsive to the travel of the at least one directional control element (19)(20). In the embodiment of the second member end location compensator (73) shown by FIGS. 8-11, each of the pair of directional control elements (19)(20) can be joined to the opposed sprocket drive ends (84)(85) of at least one sprocket drive element (86) which can engage at least one sprocket (87) and upon travel of the at least one sprocket drive element (86) the at least one shaft (88) can correspondingly rotate the at least one cam (80)(81) about the corresponding at least one cam axis (82)(83). As the at least one cam (80)(81) rotates about the corresponding at least one cam axis (82)(83), the at least one cam surface (89)(90) can rotationally engage at least one cam engagement surface (91)(92) (for example, the pair of cam engagement surfaces as shown by FIGS. 8-11). The pair of members (27)(28) can be made responsive to rotational engagement of the at least one cam (80)(81) to at least one cam engagement surface (91)(92) (as shown by FIG. 9) such that as at least one cam (80)(81) rotates the distance (93) between the pair of second member ends adjusts to compensate for the amount of rotation (31)(32) of the pair of axle ends (29)(30).

While the applicant has provided particular examples of a second member end location compensator (73), these examples are not intended to be limiting, but rather illustrative of the varied apparatus and methods by which the distance (93) between the second member ends (41) can be adjusted to compensate for the amount of rotation (31)(32) of the pair of axle ends (29)(30) generated by linear travel of the pair of members (27)(28) in response to the at least one directional control element (19)(20).

Now referring primarily to FIGS. 6-7 and 9-11, the invention can further include an opposed reciprocal travel coordinator (94) which maintains substantially equal measure of opposed reciprocal travel (23)(24) between each of the pair of direction control elements (19)(20). First referring to the example shown by FIG. 4, a slotted member (111) can be rotationally responsive (112) to the opposed directional travel (23)(24) of the pair of directional control elements (19)(20). As to the embodiment of the invention shown by FIG. 4, the slotted member (111) provides a pair of slots (105)(106) one each located on either side of slotted member pivot element (107) which allows the slotted member (111) to rotate about the slotted member pivot element axis (108). A projection element (109)(110) can be coupled to each of the pair of direction control elements (19)(20) at a location such that each of the projection elements (109)(110) can travel within a corresponding one of the pair of slots (105)(106) in response to opposed directional travel (23)(24) of the pair of directional control elements (19)(20). Travel of either projection element (109)(110) in the corresponding one of the pair of slots (105)(106) generates rotation of the slotted member (111) about the slotted member pivot element (107). Rotation of the slotted member (111) about the slotted member pivot element (107) can generate travel in the other of the pair of projection elements (109)(110) which in turn generates travel in the coupled directional control element (19)(20).

Figure 6:
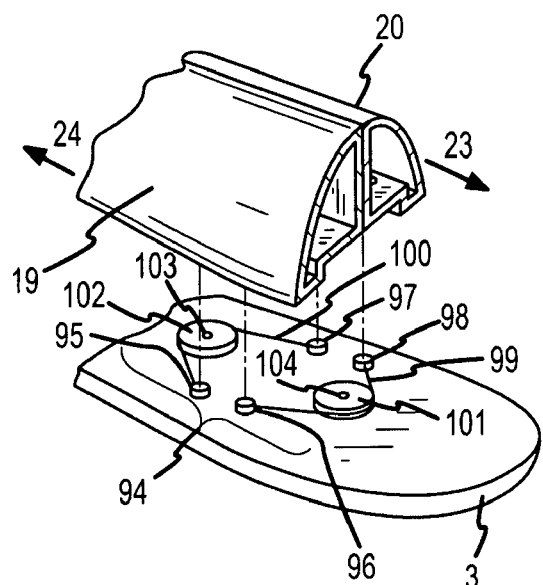
FIG. 6 is an exploded view of a portion of the embodiment of the invention shown by FIG. 5 which shows a particular embodiment of an opposed reciprocal travel coordinator which maintains substantially equal measure of opposed reciprocal travel of each one of the pair of members.
Figure 7:
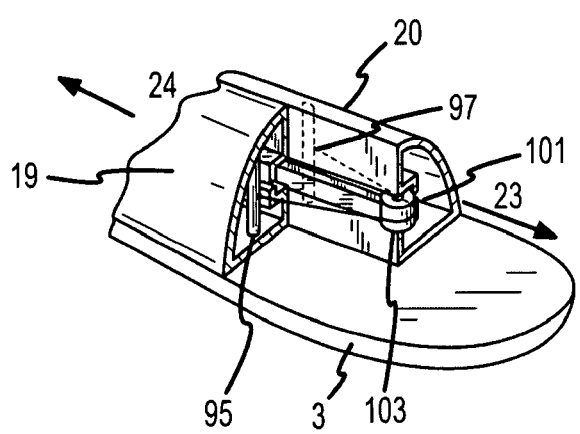
FIG. 7 is a cut away view of a portion of the embodiment of the invention shown by FIG. 5 which shows another particular embodiment of an opposed reciprocal travel coordinator which maintains substantially equal measure of opposed reciprocal travel of each one of the pair of members.

Now referring to the example shown by FIGS. 6 and 7, each of the pair of direction control elements (19)(20) can be joined to a pair of cable ends (95)(96) and (97)(98) of a pair of cables (99)(100) each of which engage at least one pulley (101)(102) )(at least one sprocket, annular members, or other surface over which the cable can travel) each of which can rotate about a pulley axis (103)(104) in response to opposed directional travel (23)(24) of the pair of direction control elements (19)(20). The at least one cable retains sufficient tension about the at least one pulley (101)(102) such that travel of the first of the pair of directional control elements (19) in a first direction (24) generates travel of the second of the pair of directional control elements (20) in the opposite second direction (23)(opposed reciprocal travel) and conversely travel of the second of the pair of directional control elements (20) in a first direction (24) generates travel of the first of the pair of directional control elements (19) in the opposite second direction (23)(opposed reciprocal travel). As shown by FIGS. 9-11, the opposed reciprocal travel coordinator (94) can operate as part of or in combination with the above-described second member end location compensator (73).

As can be easily understood from the foregoing, the basic concepts of the present invention may be embodied in a variety of ways. The invention involves numerous and varied embodiments of a cycle direction control and methods of making and using such cycle direction control.

As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "control" should be understood to encompass disclosure of the act of "controlling"—whether explicitly discussed or not—and, conversely, were there effectively disclosure of the act of "controlling", such a disclosure should be understood to encompass disclosure of a "control" and even a "means for controlling." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the cycle direction control herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below are intended describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A cycle direction control on a cycle, comprising:
    a) a pair of members each of which contains a first member end and a second member end;
    b) an axle which defines an axis;
    c) a first annular member rotatable about said axis and located between said pair of members;
    d) a pair of pivot elements each of which pivotally join an end of said axle to said second member end of each of said pair of members; and
    e) at least one direction control element coupled to at least one of said pair of members proximate to a corresponding said first member end, wherein an amount of travel of said at least one direction control element generates an amount of linear travel of at least one of said pair of members, and wherein said amount of linear travel of said at least one of said pair of members generates an amount of rotation of pivotal each end of said axle about a corresponding pivot element of said pair of pivot elements coupled to said second member end to control a direction of said first annular member which alters a travel direction of said cycle.

2. The cycle direction control as described in claim 1, further a comprising a frame member on said cycle which slidely engages said at least one direction control element to allow said amount of travel of said at least one direction control element to generate said amount of pivotal rotation of each end of said axle end about said corresponding pivot element to control said direction of said first annular member.

3. The cycle direction control as described in claim 2, wherein said frame member comprises a frame member which telescopically engages said at least one direction control element.

4. The cycle direction control as described in claim 3, further comprising a seat coupled to said frame member and a grip coupled to said at least one direction control element, wherein said seat and said grip comprise a configuration for providing support of a cycle operator while said cycle operator engages said grip with a hand.

5. The cycle direction control as described in claim 4, wherein said configuration for providing support of a cycle operator while said cycle operator engages said grip with a hand further provides a configuration for allowing said cycle operator to variably adjust a location of a hand which engages said grip to generate said amount of travel of said at least one direction control element.

6. The cycle direction control as described in claim 5, further comprising a pair of forks coupled to said frame member between which a second annular member rotates about an axis.

7. The cycle direction control as described in claim 6, further comprising an annular member rotation generator operably coupled to said first annular member or said second annular member for generating rotation of said first or said second annular member.

8. The cycle direction control as described in claim 7, wherein said annular member rotation generator comprises:
    a. a pair of pedals coupled to opposed ends of a shaft defining a shaft axis about which said pair of pedals rotationally reciprocate to rotate said shaft, wherein said pair of pedals comprise a configuration for allowing feet of said cycle operator to be engaged by said pair of pedals; and
    b. a circuitous force transfer element which engages at least two rotation means to establish a circuitous travel path, wherein a first of said at least two rotation means couples to said shaft, and wherein a second of said at least two rotation means couples to said second annular member, and wherein rotation of said shaft generates circuitous travel of said circuitous force transfer element in said circuitous travel path to generate rotation of said second annular member between said pair of forks.

9. The cycle direction control as described in claim 8, wherein said at least one direction control element comprises a pair of direction control elements having opposed reciprocal travel.

10. The cycle direction control as described in claim 9, further comprising an opposed reciprocal travel coordinator which maintains substantially equal measure of opposed reciprocal travel of each one of said pair of direction control elements.

\* \* \* \* \*